United States Patent
Ziegler et al.

(10) Patent No.: US 7,065,101 B2
(45) Date of Patent: Jun. 20, 2006

(54) MODIFICATION OF BUS PROTOCOL PACKET FOR SERIAL DATA SYNCHRONIZATION

(75) Inventors: Frederick J. Ziegler, Rochester, MN (US); Mark J. Hickey, Rochester, MN (US); Jack C. Randolph, Rochester, MN (US); Susan M. Cox, Rochester, MN (US); Dale J. Thomforde, Pine Island, MN (US)

(73) Assignee: International Business Machines Corporation, Armonk, NY (US)

( * ) Notice: Subject to any disclaimer, the term of this patent is extended or adjusted under 35 U.S.C. 154(b) by 932 days.

(21) Appl. No.: 10/003,366

(22) Filed: Nov. 15, 2001

(65) Prior Publication Data

US 2003/0091039 A1    May 15, 2003

(51) Int. Cl.
*H04J 3/22* (2006.01)
*H04J 3/06* (2006.01)

(52) U.S. Cl. ............... 370/467; 370/503; 370/535; 375/354; 710/71

(58) Field of Classification Search .......... 370/506, 370/536, 537, 366; 710/71; 375/363
See application file for complete search history.

(56) References Cited

U.S. PATENT DOCUMENTS

| | | | | |
|---|---|---|---|---|
| 4,417,334 A | * | 11/1983 | Gunderson et al. | 370/402 |
| 4,486,739 A | | 12/1984 | Franaszek et al. | 340/347 DD |
| 4,590,467 A | * | 5/1986 | Lare | 340/825.5 |
| 5,243,334 A | * | 9/1993 | Georgiou et al. | 340/2.21 |
| 5,598,442 A | * | 1/1997 | Gregg et al. | 375/354 |
| 6,054,944 A | * | 4/2000 | Yamashita | 341/95 |
| 6,438,175 B1 | * | 8/2002 | Yamashita | 375/293 |
| 6,829,315 B1 | * | 12/2004 | Cruikshank | 375/354 |

* cited by examiner

*Primary Examiner*—John Pezzlo
*Assistant Examiner*—Brian Roberts
(74) *Attorney, Agent, or Firm*—Bockhop & Associates LLC

(57) ABSTRACT

An apparatus for enabling transmission of parallel data from a first parallel bus to a second parallel bus via a serial data channel includes a first logic element that generates a synchronization character used in a serial data transmission protocol upon detection of a parallel synchronization packet. A serializer converts data from the first logic element into a serial data stream. A de-serializer converts the serial data stream into a plurality of parallel data packets. A second logic element detects the synchronization character and converts the synchronization character into a parallel synchronization packet.

11 Claims, 2 Drawing Sheets

MODIFICATION OF BUS PROTOCOL PACKET FOR SERIAL DATA SYNCHRONIZATION

BACKGROUND OF THE INVENTION

1. Field of the Invention

The present invention relates to computer communications and, more specifically, to a system that allows two parallel data busses to communicate with each other via a serial data stream.

2. Description of the Prior Art

Computers communicate using either serial data transmission or parallel data transmission. In serial data transmission, individual bits of data are transferred over a wire, one at a time. Parallel data transmission occurs when several bits are transmitted simultaneously, each along its own separate channel. If eight bits represent a data word being transmitted, then there must be at least eight distinct channels between the sender and receiver, plus as many additional channels as are required for control information. Although parallel transmission is universal within the computer for high speed data transfers on various buses, it is rare in environments outside that of the internal computer structure and connections between the computer and close peripherals.

In parallel transmission all the bits in a data word are transmitted along separate channels simultaneously. However, due to natural aberrations in the structure of each line (e.g. resistance), the signals do not arrive at the receiver at the same time. This problem is known as "skew," which increases in severity as the distance between sender and receiver grows larger. The difficulties encountered when implementing parallel transmission over long distances can be eliminated by using serial data transmission. The source of the problems in parallel transfers is the use of multiple lines to transmit data bits simultaneously. However, with the serial approach this does not occur as just a single line is used and the bits, comprising a data word, are sent one bit at a time. Serial transmission offers several advantages, including a savings in cost—only one data channel is needed instead of several—and the problem of skewing does not arise.

One major difficulty in data transmission is that of synchronizing the receiver with the sender. This is particularly true in serial data transfer, where the receiver must be able to detect the beginning of each new character in the bit stream being presented to it. If the receiver is unable to achieve this, it will not be able to interpret the incoming bit stream correctly. Two approaches are used to solve the problem of synchronization: asynchronous transmission and synchronous transmission.

Using the asynchronous transmission approach, synchronization is implemented at character level and each individual character is transmitted along with the necessary control information to allow this to take place. The control information consists of additional bits added to each character: "start bits" that indicate that transmission is about to commence, and "stop bits" that indicate that transmission is about to cease. Asynchronous transmission has several advantages. For example, each individual character is complete in itself. If a character is corrupted during transmission, its successor and predecessor will be unaffected. However, a high proportion of the transmitted bits are used uniquely for control purposes and thus carry no useful information. Also, because of distortion, the speed of transmission is limited. Therefore, asynchronous serial transmission is normally used only for transmission speeds of up to 3000 bits per second, with only simple, single-character error detection.

The synchronous transmission approach again transmits the message via a single channel. However, in this instance there is no control information associated with individual characters. Instead, the characters are grouped together in blocks of some fixed size and each block transmitted is preceded by one or more special synchronization characters, which can be recognized by the receiver. With the synchronous approach, the amount of central information that must be transmitted is restricted to only a few characters at the start of each block. The system is not so prone to distortion as asynchronous communication and can thus be used at higher speeds. Therefore, serial synchronous transmission is principally used for high-speed communication between computers.

Many computers communicate with other computers using parallel data transmission protocols. Wired parallel data busses have a limited length over which the data can be transmitted. However, modern computer communications often require computers to communicate over ever increasing distances. One approach to allowing longer distance communications is to convert parallel data to a serial data stream, that is then transmitted over an optical transmission channel.

Typically, a parallel data communications protocol transmits a synchronization data packet that aligns the data clock of the transmitter with that of the receiver. Serial data requires synchronization characters so that the individual bits can be grouped into the correct bytes. However, if the original interface protocol was not designed for a serial interface (e.g., a fiber-optic interface), the synchronization character will not be present in the data stream and there may not be sufficient bandwidth to insert a synchronization character.

Therefore, there is a need for a method and apparatus that detects synchronization packets from a parallel transmitter, converts them into synchronization characters for a serial data channel and reconverts them back to synchronization packets to be delivered to a parallel receiver.

SUMMARY OF THE INVENTION

The disadvantages of the prior art are overcome by the present invention which, in one aspect, is a method and an apparatus for enabling transmission of parallel data, including a plurality of parallel synchronization packets, from a first parallel bus to a second parallel bus via a serial data channel. The serial data channel has a first logical terminal and a different second logical terminal. A first logic element, in data communication with the first parallel bus, detects a parallel synchronization packet in the parallel data received from the first parallel bus and generates a synchronization character used in a serial data transmission protocol upon detection of the parallel synchronization packet. The first logic element is also configured to output the parallel data so that the parallel synchronization packet is replaced by the synchronization character. A serializer, in data communication with the first logic element and the first logical terminal of the serial data channel, converts data from the first logic element into a serial data stream that is transmitted to the first logical terminal of the serial data channel. The serial data stream includes the synchronization character. A deserializer, in data communication with the second logical terminal of the serial data channel, converts the serial data stream into a plurality of parallel data packets. A second logic element, in data communication with the de-serializer and the second parallel bus, detects the synchronization character and converts the synchronization character into a parallel synchronization packet. The second logic element also transmits the plurality of data packets onto the second parallel bus.

This and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
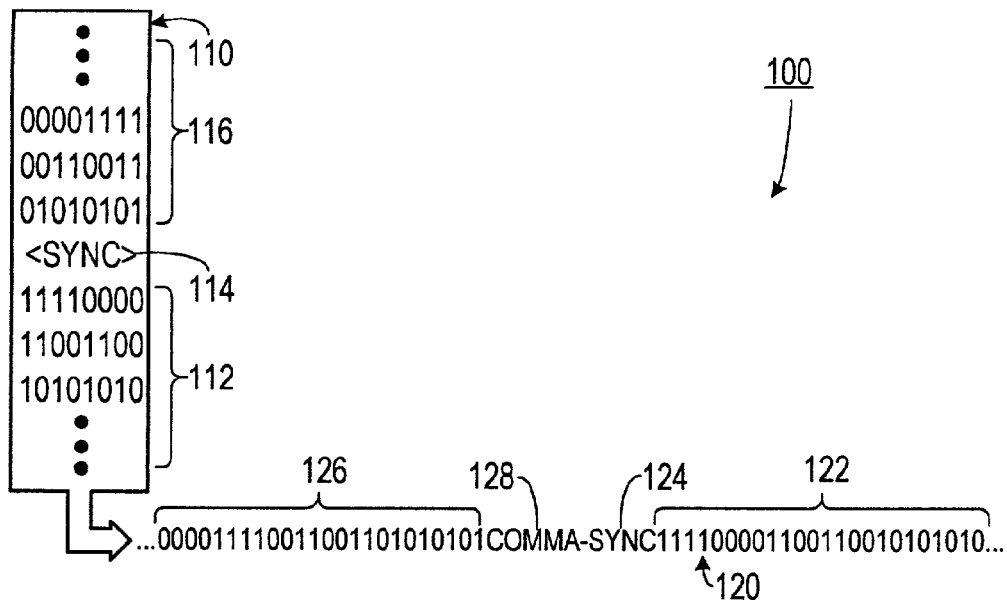
FIG. 1 is a conceptual diagram showing conversion of a parallel data stream to a serial data stream according to the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

The invention converts an existing clock synchronization packet into a packet that contains the serial data synchronization character, sends the synchronization character over the serial link so that byte alignment can be performed, and then converts this packet back into its original form to be sent on the parallel interface.

As shown in FIG. 1, one embodiment of the invention is a method of communicating data from one parallel data bus to a second parallel data bus via a serial data channel. The parallel data bus transmits a plurality of parallel data packets 110 that is organized into blocks of parallel data words (e.g., a first block 112 and a second block 116) that are separated by at least one synchronization packet 114. The parallel data packets 110 are converted into a serial data stream 120 that corresponds to the ordering of data in the parallel data packets 110. Each time a synchronization packet 114 is detected, a synchronization character 124 is generated and placed in the corresponding position in the serial data stream 120. A comma character 128 may also be included to condition the serial data stream 120 for use with a protocol of a specific apparatus. Once the serial data is received, it is converted back to parallel data.

Figure 2:
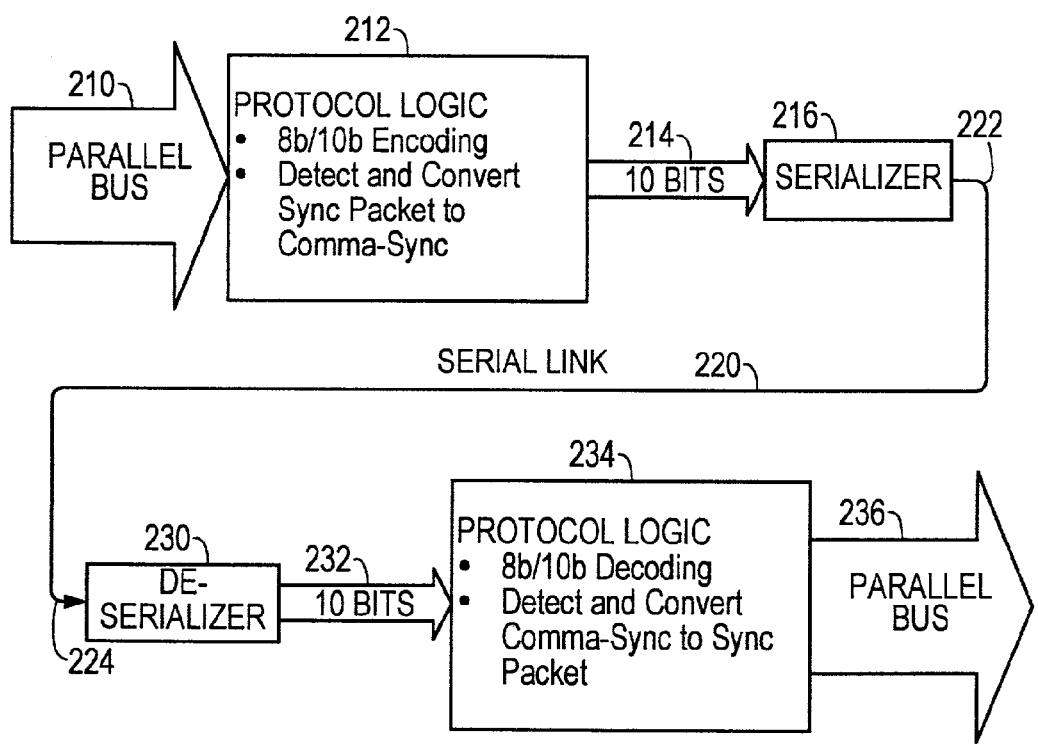
FIG. 2 is a block diagram of one embodiment of the invention.

As shown in FIG. 2, an apparatus according to the invention includes a first parallel bus 210 and a second parallel bus 236 that are in data communication via a serial data channel 220. The serial data channel 220 has a first logical terminal 222 and a second logical terminal 224. In the example shown, the first parallel bus 210 and the second parallel bus 236 each operate with a word length of eight bits (however, it is understood that word length may vary from embodiment to embodiment). A first logic element 212 is in data communication with the first parallel bus 210. The first logic element 212 detects the parallel synchronization packet in the parallel data received from the first parallel bus 210 and generates a synchronization character used in a serial data transmission protocol. The first logic element 212 also generates a comma character with the synchronization character in order to comply with the serial data transfer protocol being used (as is readily understood, other serial data transfer protocols may require other characters to be added). Next, the first logic element 212 converts the eight bit-wide data received from the first parallel bus 210 into a ten bit format. This is to align the data with the protocol used to serialize the data. Thus, the parallel data is output from the first logic element 212 in a ten bit format with the synchronization packets being replaced by synchronization and comma characters. The first logic element 212 could include combinatorial logic gates or pre-designed units, such as encoders and decoders.

A serializer 216 is in data communication with the first logic element 212 and the first logical terminal 222 of the serial data channel 220. The serializer 216 converts the ten bit-wide data 214 from the first logic element 212 into a serial data stream that is transmitted to the first logical terminal 222 of the serial data channel 220 so that the parallel data is transmitted in a serial data stream.

The serial data stream is transmitted by the serial data channel 220 to a de-serializer 230 that is in data communication with the second logical terminal 224 of the serial data channel 220. The de-serializer 230 converts the serial data stream into a plurality of parallel data packets that have a ten bit word length.

A second logic element 234 is in data communication with the ten bit wide parallel data stream 232 from the de-serializer 230 and the second parallel bus 236. The second logic element 234 detects the synchronization character and converts the synchronization character into a parallel synchronization packet. The second logic element 234 also converts the ten bit wide data packets into eight bit wide packets (used by the parallel bus protocol) and transmits them onto the second parallel bus 236. The second logic element 234 could include combinatorial logic gates or pre-designed units, such as encoders and decoders.

The first parallel bus 210 and the second parallel bus 236 operate on separate clock domains and the frequency and phase of each clock may not match. The bus protocol includes a clock synchronization packet that is used to synchronize the data to the clocks on the two domains. The synchronization packet is transmitted continuously for a specified period of time at initialization to obtain synchronization and subsequently transmitted periodically at prescribed intervals to maintain synchronization. As the data is converted using an 8b/10b encoding scheme to be transmitted over the serial channel 220, this synchronization packet is detected and converted into two special characters for the serial data alignment. In one embodiment, the characters used for serial data alignment are the K28.5 comma character followed by th D27.1 sync character. When the data has been recovered by the receiving node, the serial data alignment packet (including the comma characters and the synchronization character) is used in the de-serializer 230 to determine the byte alignment of the data. The comma-sync is then detected in the protocol logic and converted back to the clock synchronization packet before it is sent on the second parallel bus 236.

In one example, the serial data channel 220 is a serial optical link. One suitable example of a device that may be used as both a serializer 216 and a de-serializer 230 is the SerDes (part no. HDMP 2631) available from Agilent Technologies.

Figure 3:
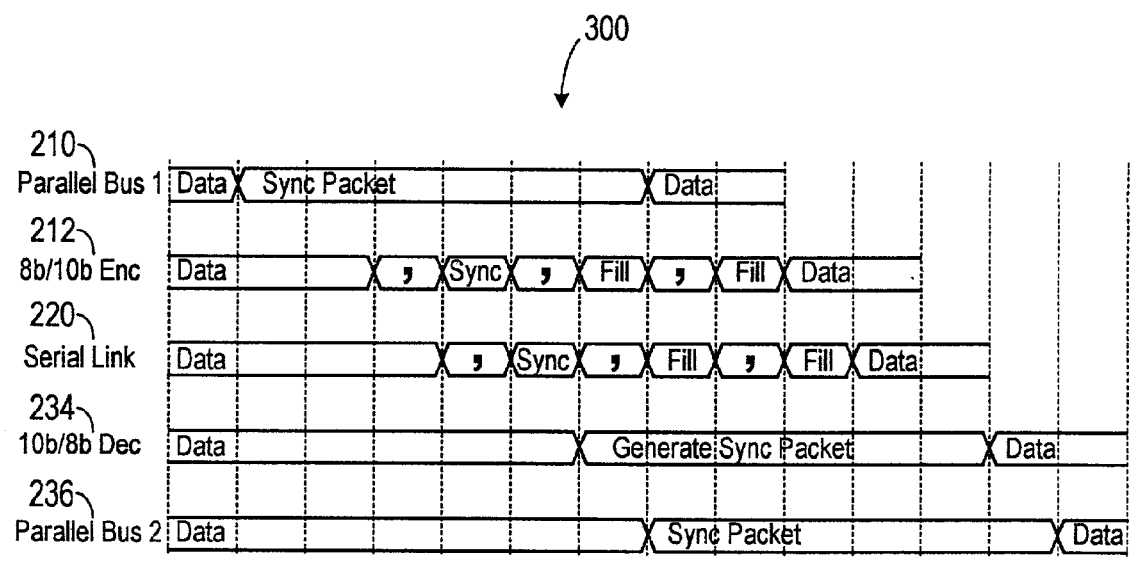
FIG. 3 is a timing diagram showing data operations executed by the embodiment shown in FIG. 2.

FIG. 3 is a timing diagram 300 showing the data flow for the various elements of the invention. As can be seen, additional comma characters and fill characters may be required to fit a particular data transmission protocol. It is understood that the scope of the claims below covers application of the invention to all such protocols.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. An apparatus for enabling transmission of parallel data, including a plurality of parallel synchronization packets, from a first parallel bus to a second parallel bus via a serial data channel, having a first logical terminal and a different second logical terminal, comprising:
   a. a first logic element, in data communication with the first parallel bus, that detects a parallel synchronization packet in parallel data received from the first parallel bus and that generates a synchronization character used in a serial data transmission protocol upon detection of the parallel synchronization packet, the first logic element also configured to output the parallel data so that the parallel synchronization packet is replaced by the synchronization character;
   b. a serializer, in data communication with the first logic element and the first logical terminal of the serial data channel, that converts data from the first logic element into a serial data stream that is transmitted to the first logical terminal of the serial data channel, the serial data stream including the synchronization character;
   c. a de-serializer, in data communication with the second logical terminal of the serial data channel, that converts the serial data stream into a plurality of parallel data packets; and
   d. a second logic element, in data communication with the de-serializer and the second parallel bus, that detects the synchronization character and that converts the synchronization character into a parallel synchronization packet and that transmits the plurality of data packets onto the second parallel bus.

2. The apparatus of claim 1, wherein the first logic element further converts the plurality of parallel data packets to a word length that corresponds to a protocol employed by the serializer.

3. The apparatus of claim 2, wherein the first logic element performs an 8b/10b encoding.

4. The apparatus of claim 1, wherein the first logic element further inserts a comma character adjacent to the synchronization character.

5. The apparatus of claim 1, wherein the second logic element further converts the plurality of parallel data packets from the de-serializer to a word length that corresponds to a protocol employed by the second parallel bus.

6. The apparatus of claim 5, wherein the second logic element performs an 8b/10b decoding.

7. A method of enabling transmission of parallel data, including a plurality of parallel data packets and a plurality of parallel synchronization packets, from a first parallel bus to a second parallel bus via a serial data channel, having a first logical terminal and a different second logical terminal, comprising the steps of:
   a. converting each of the plurality of parallel data packets received from the first parallel bus into a serial data stream in a sequence corresponding to a sequence in which each parallel data packet is received from the first parallel bus;
   b. detecting a parallel synchronization packet received from the first parallel bus and inserting a synchronization character and a comma character into the serial data stream at a position corresponding to a position in the first parallel bus from which the synchronization packet was received, thereby replacing the synchronization packet;
   c. transmitting the serial data stream to the first logical termination of the serial data channel;
   d. receiving the serial data stream from the second logical terminal of the serial data channel, converting the serial data stream back into the plurality of parallel data packets while detecting the synchronization character and the comma character and inserting a parallel synchronization packet at a position in the plurality of parallel data packets corresponding to the position in the serial data stream where the comma character and the synchronization character were detected; and
   e. transmitting the plurality of parallel data packets onto the second parallel bus.

8. The method of claim 7, further comprising the step of converting the plurality of parallel data packets to a word length that corresponds to a protocol employed by the serializer.

9. The method of claim 8, wherein the converting step comprises performing an 8b/10b encoding.

10. The method of claim 7, further comprising the step of converting the plurality of parallel data packets from the de-serializer to a word length that corresponds to a protocol employed by the second parallel bus.

11. The method of claim 10, wherein the converting step comprises performing an 8b/10b decoding.

* * * * *